United States Patent
Cho et al.

(10) Patent No.: US 9,749,799 B2
(45) Date of Patent: Aug. 29, 2017

(54) METHOD AND DEVICE FOR DETERMINING DISTANCE BETWEEN DEVICES

(71) Applicant: SAMSUNG ELECTRONICS CO., LTD., Suwon-si (KR)

(72) Inventors: Ho-sik Cho, Suwon-si (KR); Jianxun Ji, Beijing (CN); Zili Chen, Beijing (CN); Hyun-cheol Park, Suwon-si (KR); Won-suck Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/002,872

(22) Filed: Jan. 21, 2016

(65) Prior Publication Data

US 2016/0212587 A1 Jul. 21, 2016

Related U.S. Application Data

(60) Provisional application No. 62/105,935, filed on Jan. 21, 2015.

(30) Foreign Application Priority Data

Jun. 16, 2015 (KR) .................. 10-2015-0085143

(51) Int. Cl.
*H04W 24/00* (2009.01)
*H04W 4/02* (2009.01)
*H04W 4/00* (2009.01)

(52) U.S. Cl.
CPC .......... *H04W 4/023* (2013.01); *H04W 4/005* (2013.01)

(58) Field of Classification Search
None
See application file for complete search history.

(56) References Cited

U.S. PATENT DOCUMENTS

2007/0040545 A1* 2/2007 Takiguchi ............... G01S 11/06
324/76.11
2007/0168127 A1* 7/2007 Zaruba ................... A61B 5/053
701/500

(Continued)

FOREIGN PATENT DOCUMENTS

KR  10-0583401 B1  5/2006
KR  10-1390722 B1  4/2014

OTHER PUBLICATIONS

"Bluetooth Specification 4.2", Dec. 2, 2014, 2772 pages total, Version 4.2 vol. 0, Bluetooth SIG, Inc., https://www.bluetooth.org/en-us/specification/adopted-specifications.

(Continued)

Primary Examiner — Erika Washington
(74) Attorney, Agent, or Firm — Sughrue Mion, PLLC

(57) ABSTRACT

A method of determining a distance between devices, including receiving, by a device, a first signal from a target device, the first signal being associated with a first intensity; receiving, from a reference device located at a predetermined distance from the target device, intensity information corresponding to a second intensity associated with a second signal received by the reference device from the target device; and determining a distance between the device and the target device based on the first intensity and the intensity information corresponding to the second intensity.

20 Claims, 9 Drawing Sheets

(56) References Cited

U.S. PATENT DOCUMENTS

| | | | |
|---|---|---|---|
| 2012/0077513 A1* | 3/2012 | Rizzello | G01S 5/14 |
| | | | 455/456.1 |
| 2014/0030982 A1* | 1/2014 | Cardona | G01S 5/14 |
| | | | 455/67.11 |
| 2014/0120931 A1 | 5/2014 | Shin et al. | |
| 2014/0243016 A1 | 8/2014 | Denis et al. | |
| 2015/0031393 A1* | 1/2015 | Post | H04W 4/025 |
| | | | 455/456.2 |

OTHER PUBLICATIONS

Cavallini et al., "iBeacon Bible 2.0", Jun. 17, 2014, 24 pages total, WordPress.com, https://meetingofideas.files.wordpress.com/2014/06/ibeacon-bible-2-0.pdf.

Kumar et al., "Distance Measurement and Error Estimation Scheme for RSSI Based Localization in Wireless Sensor Networks", 2009, 4 pages total, IEEE.

Dong et al., "Evaluation of the Reliability of RSSI for Indoor Localization", 2012, 6 pages total, IEEE.

Tjensvold, "Comparison of the IEEE 802.11, 802.15.1, 802.15.4 and 802.15.6 wireless standard", Sep. 18, 2007, 7 pages total.

"Android Beacon Library", AltBeacon, 2014, 3 pages total, GithHub Inc., https://github.com/altbeacon/adroid-beacon-libary.

\* cited by examiner

METHOD AND DEVICE FOR DETERMINING DISTANCE BETWEEN DEVICES

CROSS-REFERENCE TO RELATED APPLICATIONS

This application claims priority from U.S. Provisional Application No. 62/105,935, filed on Jan. 21, 2015, in the US Patent Office, and benefit from Korean Patent Application No. 10-2015-0085143, filed on Jun. 16, 2015, in the Korean Intellectual Property Office, the disclosures of which are incorporated herein in their entireties by reference.

BACKGROUND

1. Field

The present disclosure relates to a method by which a device determines a distance between devices, a method by which a reference device determines a distance between devices, a device for determining a distance between devices, a reference device for determining a distance between devices, and a recording medium having recorded thereon a program for performing a method of determining a distance between devices.

2. Description of the Related Art

The Internet has been evolving from a human-oriented connection network in which a human being generates and consumes information to Internet of Things (IoT) in which components such as things process information by giving and taking the information therebetween. Internet of Everything (IoE) technology in which technology of processing big data through a connection with a cloud server and the like is combined with IoT technology has also been on the rise. To implement IoT, techniques such as a sensing technique, a wired/wireless communication and network infrastructure, a service interface technique, and a security technique may be necessary, and thus, research of a sensor network technique, a machine to machine (M2M) communication technique, a machine type communication (MTC) technique, and the like have been recently conducted.

In an IoT environment, an internet technology (IT) service in which data generated by connected things are collected and analyzed to create a new value for the life of a user may be provided.

SUMMARY

Provided are methods of accurately measuring a distance between devices even when information by which the distance between the devices is determined is changed according to an environment between the devices as methods of determining a distance between a plurality of devices.

Additional aspects will be set forth in part in the description which follows and, in part, will be apparent from the description, or may be learned by practice of the presented exemplary embodiments.

According to an aspect of an exemplary embodiment, a method of determining a distance between devices includes receiving, by a device, a first signal from a target device, the first signal being associated with a first intensity; receiving, from a reference device located at a predetermined distance from the target device, intensity information corresponding to a second intensity associated with a second signal received by the reference device from the target device; and determining a distance between the device and the target device based on the first intensity and the intensity information corresponding to the second intensity.

The determining of the distance may further include comparing the second intensity, which corresponds to the preset distance between the target device and the reference device, with the first intensity.

The first signal may be broadcasted from the target device at an output intensity, and the second signal may be broadcasted from the target device at the output intensity.

The intensity information may further include a packet including a power value indicating the second intensity from the reference device, and the method may further include: decoding the received packet; and acquiring the power value from the decoded packet.

The method may further include acquiring, from the target device, reference intensity information indicating an intensity of a received signal per a unit distance, which has been predetermined by the target device; and determining channel state between the device and the target device by comparing the reference intensity information with the intensity information.

The method may further include establishing short-range communication between the device and the target device based on a Bluetooth low energy (BLE) protocol.

According to another aspect of an exemplary embodiment, a method of determining a distance between devices includes receiving, by a reference device, a first signal from a target device located at a preset distance from the reference device; generating intensity information indicating an intensity of the first signal; and transmitting the generated intensity information to a device which communicates with the target device, wherein the transmitted intensity information may be used by the device to determine a distance between the device and the target device.

The transmitted intensity information may be used by the device to determine the distance between the device and the target device by being compared with an intensity of a second signal received by the device from the target device.

The first signal may be broadcasted from the target device at an output intensity, and the second signal may be broadcasted from the target device at the output intensity.

The transmitting of the intensity information may further include transmitting information about the predetermined distance together with the intensity information to the device.

According to another aspect of an exemplary embodiment, a device for determining a distance between devices includes a communicator configured to receive a first signal from a target device, the first signal being associated with a first intensity, and to receive, from a reference device located at a predetermined distance from the target device, intensity information corresponding to a second intensity of a second signal received by the reference device from the target device; and a controller configured to determine a distance between the device and the target device based on first intensity and the intensity information corresponding to the second intensity.

The controller may be further configured to determine the distance between the device and the target device by comparing the second intensity, which corresponds to the predetermined distance between the target device and the reference device, and the first intensity.

The first signal may be broadcasted from the target device at an output intensity, and the second signal may be broadcasted from the target device at the output intensity.

The communicator may be further configured to receive a packet including a power value indicating the second intensity from the reference device, and the controller may be further configured to decode the received packet and acquire the power value from the decoded packet.

The communicator may be further configured to acquire, from the target device, reference intensity information indicating an intensity of a received signal per a unit distance, which has been predetermined by the target device, and the controller may be further configured to determine a channel state between the device and the target device by comparing the reference intensity information with the intensity information.

The controller may be further configured to establish short-range communication between the device and the target device based on a Bluetooth low energy (BLE) protocol.

According to yet another aspect of an exemplary embodiment, a reference device for determining a distance between devices includes a communicator configured to receive a first signal from a target device located at a predetermined distance from the reference device; and a controller configured to generate intensity information indicating an intensity of the received first signal, wherein the communicator may be further configured to transmit the generated intensity information to a device which communicates with the target device, and the transmitted intensity information may be used by the device to determine a distance between the device and the target device.

The transmitted intensity information may be used by the device to determine the distance between the device and the target device by being compared with an intensity of a second signal received by the device from the target device.

The first signal may be broadcasted from the target device at an output intensity, and the second signal may be broadcasted from the target device at the output intensity.

The communicator may be further configured to transmit information about the predetermined distance together with the generated intensity information to the device.

According to a further aspect of an exemplary embodiment, a method of determining a distance between devices includes receiving, by a user device, a first signal from a target device; measuring, by the user device, a first intensity associated with the first signal; receiving, from a reference device located at a predetermined distance from the target device, intensity information corresponding to a second signal received by the reference device from the target device; determining a second intensity associated with the second signal based on the intensity information; and determining a distance between the device and the target device based on a difference between the first intensity and the second intensity.

According to a still further aspect of an exemplary embodiment, a non-transitory computer-readable medium may have recorded thereon a computer-readable program for executing the method or methods above.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
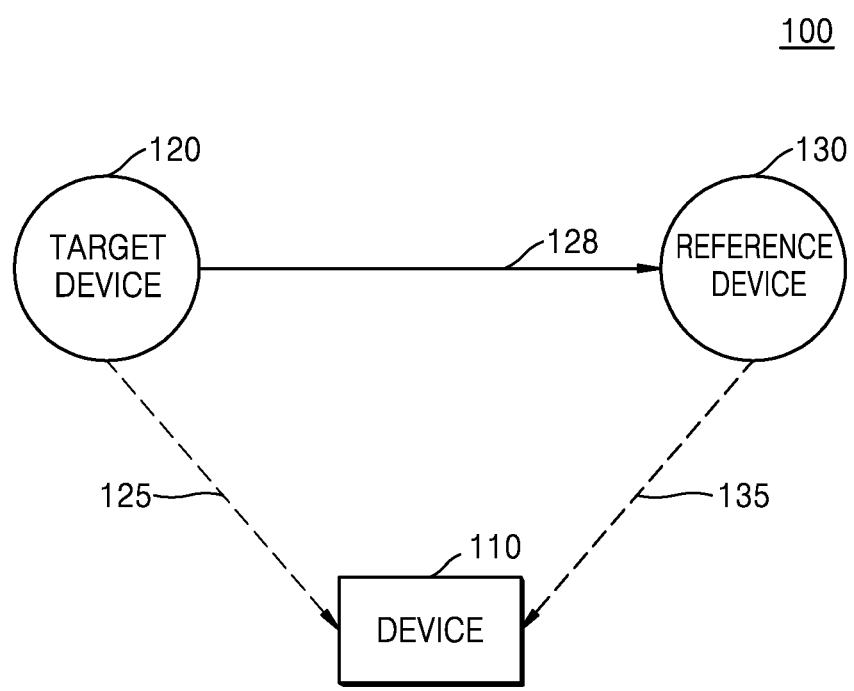
FIG. 1 illustrates a block diagram of a system for determining a distance between devices, according to an exemplary embodiment.

The terms used in the specification will be schematically described, and then, the disclosed exemplary embodiments will be described in detail.

The terms used in this specification are those general terms currently widely used in the art, but the terms may vary according to the intention of those of ordinary skill in the art, precedents, or new technology in the art. Also, specific terms may be selected by the applicant, and in this case, the detailed meaning thereof may be described in the detailed description. Thus, the terms used in the specification should be understood not as simple names, but based on the meaning of the terms and the overall description.

Throughout the specification, it will also be understood that when a component "includes" an element, unless stated otherwise, it should be understood that the component does not exclude other elements, but may further include other elements. In addition, terms such as " . . . unit", " . . . module", or the like refer to units that perform at least one function or operation, and the units may be implemented as hardware or software, or as a combination of hardware and software.

Reference will now be made in detail to exemplary embodiments, examples of which are illustrated in the accompanying drawings. In the drawings, parts irrelevant to the description may be omitted to clearly describe the exemplary embodiments, and like reference numerals denote like elements throughout the specification. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the specification, the term "intensity information" indicates an intensity of a signal received by a device. For example, when a device A receives a signal from a device B, the device A may determine intensity information about the device B by measuring an intensity of the received signal.

The intensity of the received signal may be power of the received signal. For example, when power of the signal which the device A has received from the device B is 10 mW, the intensity information about the device B may be indicated as 10 mW.

However, this is only illustrative, and the intensity information used in the exemplary embodiments is not limited thereto.

Hereinafter, the exemplary embodiments are described in detail with reference to the accompanying drawings.

FIG. 1 illustrates a block diagram of a system 100 for determining a distance between devices, according to an exemplary embodiment.

The system 100 according to an exemplary embodiment may include a device 110, a target device 120, and a reference device 130.

FIG. 1 shows only components related to the present exemplary embodiment in the system 100. Therefore, it will be understood by those of ordinary skill in the art that other general-use components besides the components shown in FIG. 1 may be further included.

The device 100 may communicate with the target device 120 and the reference device 130. According to an exemplary embodiment, the device 100 may establish short-range communication with each of the target device 120 and the reference device 130 based on, for example, a Bluetooth low energy (BLE) protocol. According to the BLE protocol, the device 110 may receive signals respectively broadcasted by the target device 120 and the reference device 130. The device 110 may detect the target device 120 and the reference device 130 based on the received signals and establish communication with each of the target device 120 and the reference device 130.

According to another exemplary embodiment, a communication protocol set between the device 110 and the target device 120 may differ from a communication protocol set between the device 110 and the reference device 130. For example, BLE communication may be established between the device 110 and the target device 120, and wireless fidelity (Wi-Fi) communication may be established between the device 110 and the reference device 130.

The communication protocols described above are only illustrative, and a communication protocol other than the communication protocols described above may be applied to one or more the exemplary embodiments.

Hereinafter, example operations of the device 110, the target device 120, and the reference device 130 are described.

The device 110 may receive a first signal, indicated for example by arrow 125, from the target device 120. The first signal may be one of signals broadcasted by the target device 120.

The device 110 may determine an intensity of the received first signal. For example, the device 110 may determine the intensity of the first signal by measuring a power of the received first signal.

In addition, the device 110 may acquire reference intensity information indicating an intensity of a received signal per preset unit distance from the received first signal. For example, the reference intensity information may indicate an intensity of the first signal received by the device 110 when a distance between the target device 120 and the device 110 is 1 m.

The target device 120 may broadcast a plurality of signals. In detail, in some exemplary embodiments the target device 120 may broadcast the plurality of signals at a same intensity. Herein, a plurality of signals broadcasted with an intensity difference that is less than a preset threshold value may also be considered as being broadcast at a same intensity.

According to an exemplary embodiment, the reference device 130 is located at a preset distance from the target device 120. For example, the reference device 130 may be located at a distance spaced apart by 1 m from the target device 120.

According to an exemplary embodiment, the reference device 130 may receive a second signal, indicated for example by arrow 128, broadcasted by the target device 120. In addition, the reference device 130 may determine an intensity of the received second signal. The reference device 130 may transmit intensity information, indicated for example by arrow 135, about the determined intensity of the second signal to the device 110. The intensity information about the intensity of the second signal may be used for the device 110 to determine a distance between the target device 120 and the device 110. A method by which the device 110 determines a distance between the target device 120 and the device 110, according to an exemplary embodiment, will be described in detail below with reference to FIGS. 2 and 3.

Figure 2:
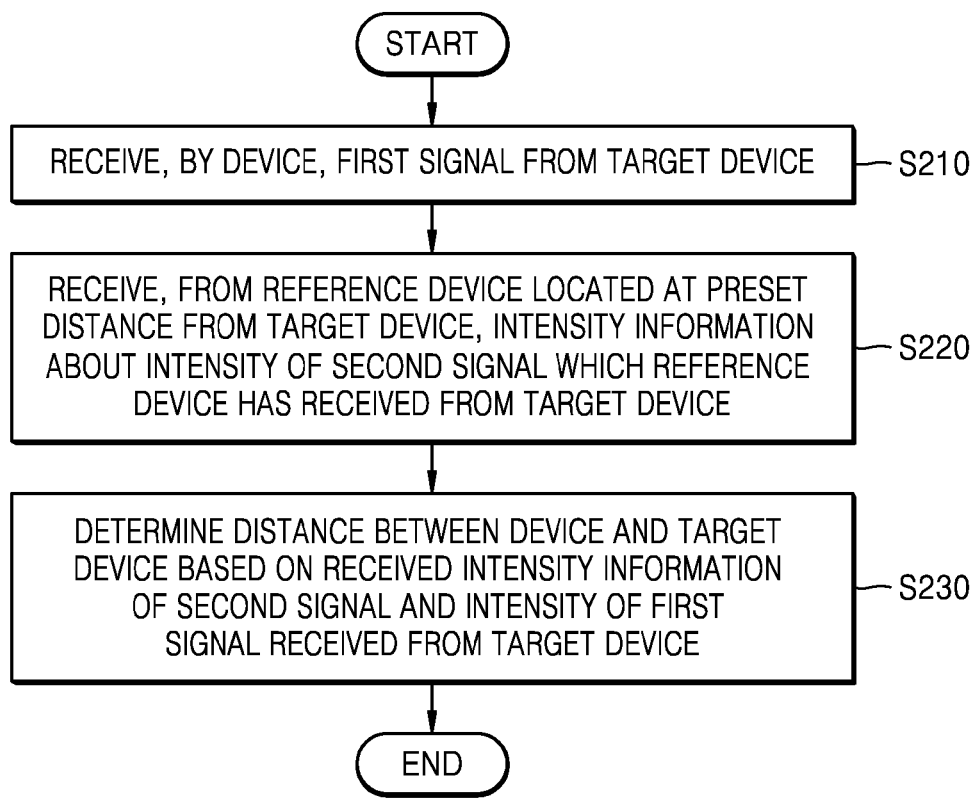
FIG. 2 illustrates a flowchart of a method by which a device determines a distance between a target device and the device, according to an exemplary embodiment.

FIG. 2 illustrates a flowchart of an example method by which the device 110 determines a distance between the target device 120 and the device 110, according to an exemplary embodiment.

In operation S210, the device 110 receives a first signal from the target device 120.

According to an exemplary embodiment, the device 110 may receive the first signal among signals broadcasted from the target device 120. Herein, the target device 120 may broadcast the signals at a same intensity.

This is only illustrative, and the first signal may be transmitted from the target device 120 to the device 110 by a scheme other than the broadcasting scheme. For example, the first signal may be transmitted from the target device 120 to the device 110 by a multicasting scheme.

In operation S220, the device 110 receives, from the reference device 130 located at a preset distance from the target device 120, intensity information about an intensity of a second signal which the reference device 130 has received from the target device 120.

The reference device 130 may be a device located at the preset distance from the target device 120. For example, the reference device 130 may be a device located at a distance of 1 m from the target device 120.

According to an exemplary embodiment, distance related information may be pre-stored in the device 110. According to another exemplary embodiment, the distance related information may be transmitted from at least one of the target device 120 and the reference device 130 to the device 110. The device 110 may determine a distance between the target device 120 and the reference device 130 by using the distance related information received from the at least one of the target device 120 and the reference device 130.

According to an exemplary embodiment, the reference device 130 may receive the second signal from the target device 120. Herein, the second signal may be one of the signals broadcasted from the target device 120 at the same intensity, the signals including the first signal received by the device 110. According to another exemplary embodiment, the second signal may be one of signals multicasted from the target device 120, the signals including the first signal.

According to an exemplary embodiment, the device 110 may acquire the intensity information about the intensity of the second signal from the reference device 130. The intensity information about the intensity of the second signal may include an intensity value of the second signal received by the reference device 130. Herein, the intensity value of the second signal received by the reference device 130 may be indicated using a power value of the received second signal. For example, the intensity value of the second signal may be 20 mW. In addition, the device 110 may acquire information about the distance between the reference device 130 and the target device 120 together with the intensity information about the intensity of the second signal.

In operation S230, the device 110 may determine the distance between the device 110 and the target device 120 based on the received intensity information of the second signal and the intensity of the first signal received from the target device 120.

According to an exemplary embodiment, the device 110 may determine the distance between the device 110 and the target device 120 by comparing the intensity of the first signal received from the target device 120 with the intensity of the second signal received by the reference device 130 located at the preset distance from the target device 120.

For example, the device 110 may determine, based on the intensity information of the second signal, that the intensity of the second signal received by the reference device 130 located at a distance of 2 m from the target device 120 is 20 mW. In addition, the device 110 may measure the intensity of the received first signal and determine that the intensity of the received first signal as 10 mW. According to an exemplary embodiment, the device 110 may determine that the distance between the device 110 and the target device 120 is 4 m, based on the facts that the intensity of the second signal received by the reference device 130 located at the distance of 2 m from the target device 120 is 20 mW, and the intensity of the first signal received by the device 110 from the target device 120 is 10 mW.

However, the example described above is intended only to describe exemplary embodiments, and the example may be described in a different way according to a relationship between an intensity of a signal and a distance in a channel environment between the device 110 and the target device 120. For example, when an intensity of a signal decreases in proportion to fourth power of a distance, the distance between the device 110 and the target device 120 may be determined in a different manner than in the example described above.

Figure 3:
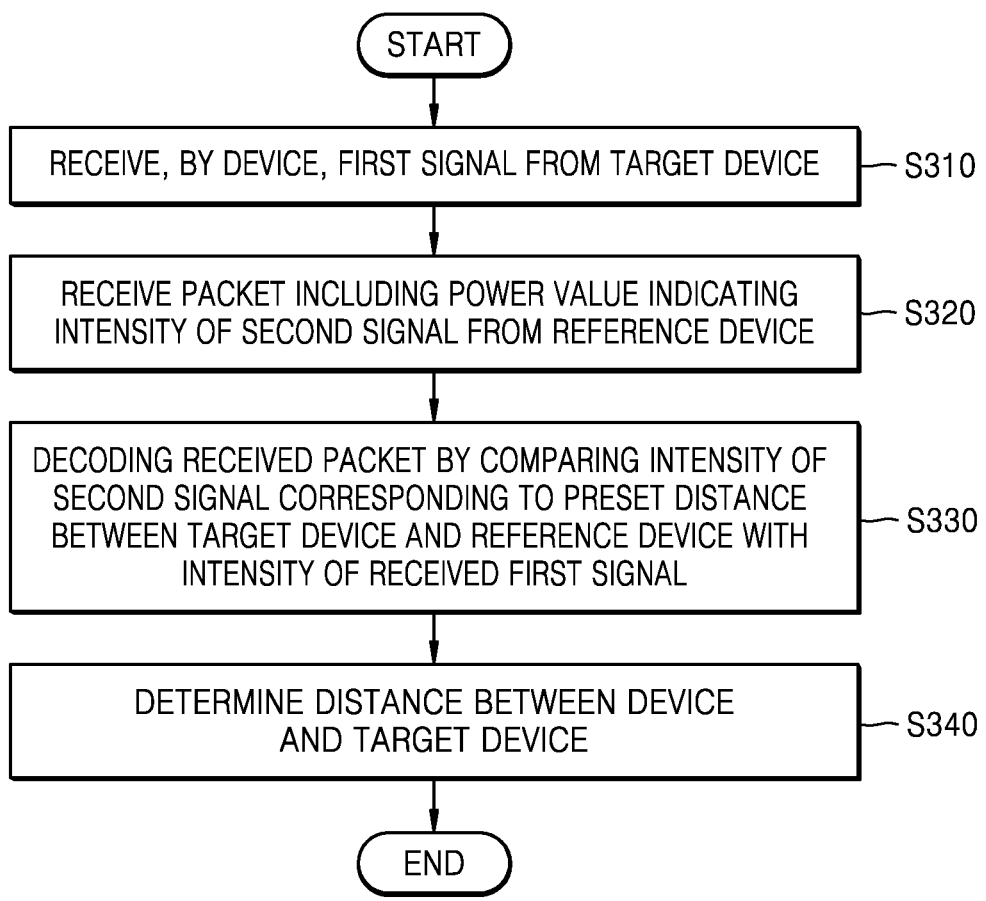
FIG. 3 illustrates a detailed flowchart of the method by which the device determines a distance between the target device and the device, according to an exemplary embodiment.

FIG. 3 illustrates a detailed flowchart of an example method by which the device 110 determines a distance between the target device 120 and the device 110, according to an exemplary embodiment.

In operation S310, the device 110 may receive a first signal from the target device 120. According to an exemplary embodiment, the device 110 may receive the first signal among a plurality of signals transmitted from the target device 120 at a same intensity.

Operation S310 may correspond to operation S210 described above with reference to FIG. 2.

In operation S320, the device 110 may receive a packet including a power value indicating an intensity of a second signal from the reference device 130. Herein, the second signal may be a signal received by the reference device 130 from among the signals broadcasted from the target device 120, the signals including the first signal received by the device 110.

The packet is an example of data transmitted from the reference device 130 to the device 110, and a type, a size, and the like of data constructing the packet may be determined according to a protocol set between the device 110 and the reference device 130.

In operation S330, the device 110 may acquire the power value indicating the intensity of the second signal by decoding the received packet. The packet received by the device 110 may include the power value indicating the intensity of the second signal. For example, the packet received by the device 110 may include information indicating that the power value corresponding to the intensity of the second signal is 20 mW.

In addition, according to an exemplary embodiment, the device 110 may acquire information about a preset distance between the target device 120 and the reference device 130 by decoding the received packet. For example, the device 110 may confirm that a distance between the target device 120 and the reference device 130 is 2 m by decoding the received packet. However, this is only illustrative, and the device 110 may receive a separate packet other than the packet including the power value indicating the intensity of the second signal and acquire information about the distance between the target device 120 and the reference device 130 from the received separate packet.

In operation S340, the device 110 may determine the distance between the device 110 and the target device 120 by comparing the intensity of the second signal corresponding to the preset distance between the target device 120 and the reference device 130 with the intensity of the received first signal.

According to an exemplary embodiment, the device 110 may determine the distance between the device 110 and the target device 120 based on the intensity of the second signal corresponding to the preset distance by using a characteristic of power of a signal which decreases according to a distance. For example, the device 110 may determine that the distance between the device 110 and the target device 120 is 4 m, based on the facts that the intensity of the second signal received by the reference device 130 located at a distance of 2 m from the target device 120 is 20 mW, and the intensity of the first signal received by the device 110 from the target device is 10 mW.

According to another exemplary embodiment, the device 110 may determine a channel state between the device 110 and the target device 120 by comparing determined intensity information of the second signal received from the reference device 130 with reference intensity information included in the first signal received from the target device. In some exemplary embodiments, when the first signal is a packet, the reference intensity information may be included in a header of the packet. The reference intensity information may indicate an intensity of a received signal per unit distance.

For example, the reference intensity information may be 30 mW per 1 m. The device 110 may determine intensity information corresponding to a distance set in the reference intensity information from the intensity information of the second signal received by the reference device 130 located at the preset distance from the target device 120. For example, when the intensity information of the second signal received by the reference device 130 located at a distance of 2 m from the target device 120 is 20 mW, the device 110 may determine that the intensity of the second signal at a distance of 1 m is 40 mW. The device 110 may compare the determined intensity information with the reference intensity information and determine that a state of a channel on which the second signal was transmitted has a better channel gain than that assumed in the reference intensity information.

According to another exemplary embodiment, the device 110 may determine the channel state between the device 110 and the target device 120 by comparing the distance between the target device 120 and the device 110, which is determined based on the intensity of the second signal and the preset distance, and the intensity information of the first signal with the reference intensity information.

Figure 4:
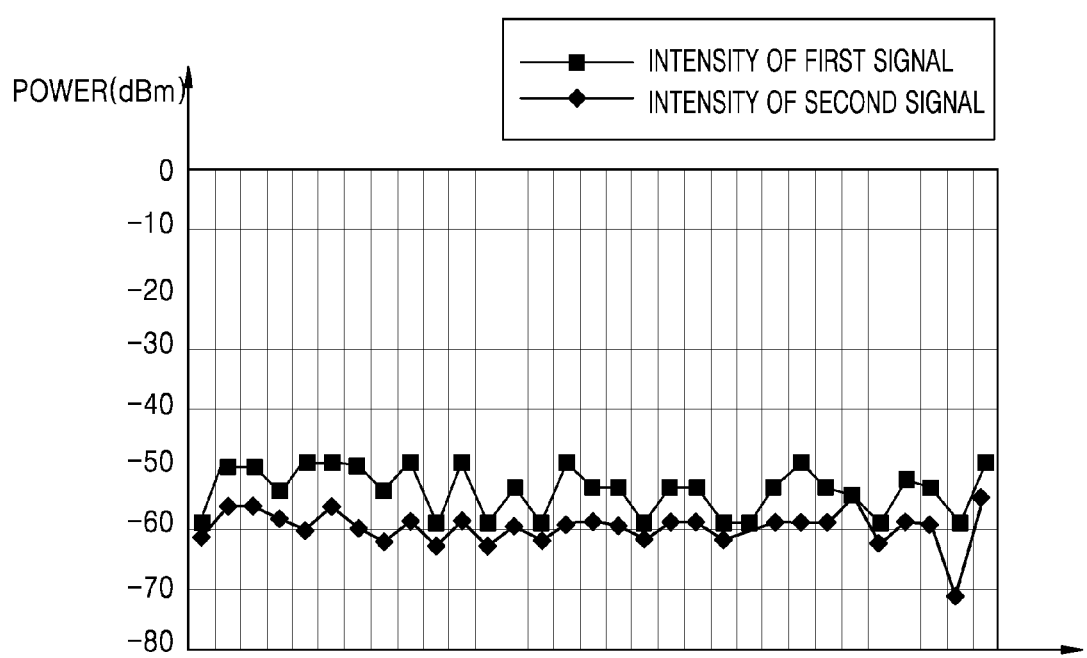
FIG. 4 illustrates a graph for describing a first signal and a second signal respectively received by the device and a reference device from the target device, according to an exemplary embodiment.

FIG. 4 illustrates a graph for describing a first signal received by the device 110 and a second signal received by the reference device 130 from the target device 120, according to an exemplary embodiment.

According to an exemplary embodiment, the target device 120 may transmit a plurality of signals. The plurality of signals may be transmitted from the target device 120 at a same intensity. For example, the target device 120 may transmit the plurality of signals having the same intensity by a broadcasting scheme, a multicasting scheme, or any other desired scheme.

The device 110 may receive the first signal that is one of the plurality of signals transmitted from the target device 120. In addition, the reference device 130 may receive the second signal that is one of the plurality of signals transmitted from the target device 120. Since the first and second signals are transmitted at the same time point and at the same intensity, the first and second signals may have a characteristic that power values of the first and second signals are similar to each other. According to FIG. 4 showing power values of the first and second signals along a distance, the power values of the first and second signals vary with similar trends.

According to an exemplary embodiment, the device 110 may confirm that a distance between the device 110 and the target device 120 is shorter that a distance between the target device 120 and the reference device 130, based on the fact that the power value of the first signal is larger than the power value of the second signal. In addition, the device 110 may determine the distance between the target device 120 and the reference device 130 by comparing the power value of the second signal, which corresponds to the preset distance between the target device 120 and the reference device 130, with the power value of the received first signal.

According to an exemplary embodiment, information about the preset distance between the target device 120 and the reference device 130 may be pre-stored in the device 110. According to another exemplary embodiment, the information about the preset distance between the target device 120 and the reference device 130 may be received by the device 110 from the target device 120 or the reference device 130. For example, the device 110 may receive a packet including the information about the preset distance between the target device 120 and the reference device 130 from the target device 120. As another example, the device 110 may receive a packet including the information about the preset distance between the target device 120 and the reference device 130 from the reference device 130.

Figure 5:
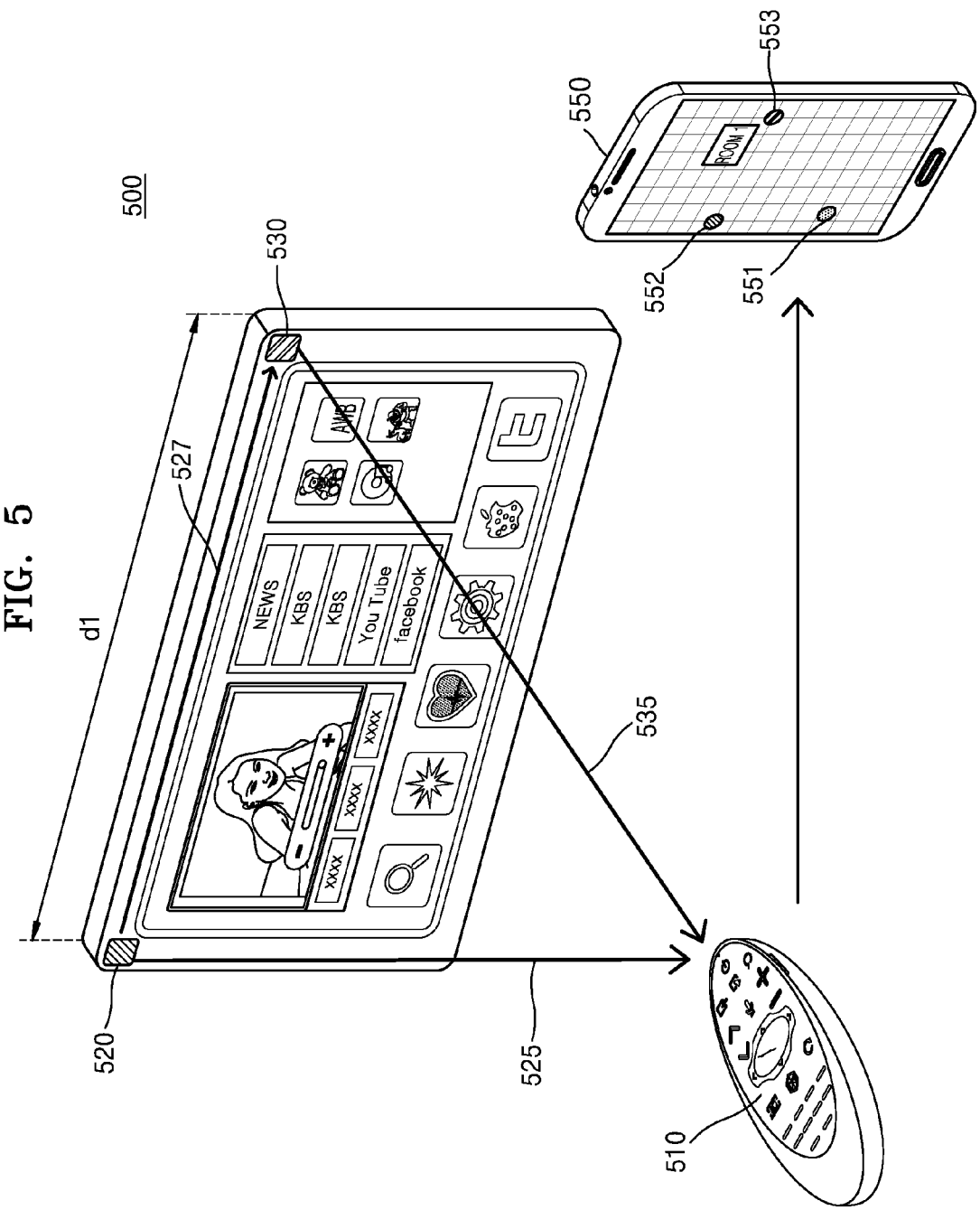
FIG. 5 illustrates a diagram for describing a method by which a first device acquires information about a determined distance from a system for determining a distance between devices, according to an exemplary embodiment.

FIG. 5 illustrates a diagram for describing a method by which a first device 550 acquires information about a determined distance from a system for determining a distance between a second device 510 and a target device 520, according to an exemplary embodiment.

Referring to FIG. 5, the first device 550 may acquire information about a distance between the second device 510 and the target device 520 from the second device 510. Hereinafter, an example method by which the first device 550 receives the information about the distance between the second device 510 and the target device 520 is described.

According to an exemplary embodiment, the target device 520 may transmit a plurality of signals. Each of the second device 510 and a reference device 530 may receive any one of the plurality of signals transmitted from the target device 520 at a same intensity. Herein, the signal received by the second device 510 from the target device 520 is referred to as a first signal 525. In addition, the signal received by the reference device 530 from the target device 520 is referred to as a second signal 527.

The second device 510 may receive, from the reference device 530, intensity information 535 about an intensity of the second signal 527 received by the reference device 530 from the target device 520. In addition, the second device 510 may receive information about a distance preset between the reference device 530 and the target device 520. For example, when the reference device 530 and the target device 520 are attached to both side corner of a smart TV, the distance between the reference device 530 and the target device 520 may be fixed. The second device 510 may determine a distance between the second device 510 and the target device 520 by comparing the intensity of the second signal, which corresponds to the distance between the reference device 530 and the target device 520, with the intensity of the first signal received by the second device 510.

According to an exemplary embodiment, the first device 550 may receive information about the determined distance between the second device 510 and the target device 520 from the second device 510. The first device 550 may determine a position of the second device 510 based on the target device 520 by using the received information about the distance between the second device 510 and the target device 520.

According to an exemplary embodiment, the first device 550 may display position information of the second device 510, the target device 520, and the reference device 530 on a screen of the first device 550. For example, positions of the second device 510, the target device 520, and the reference device 530 may be displayed as coordinates A 551, B 552, and C 553, respectively.

Figure 6:
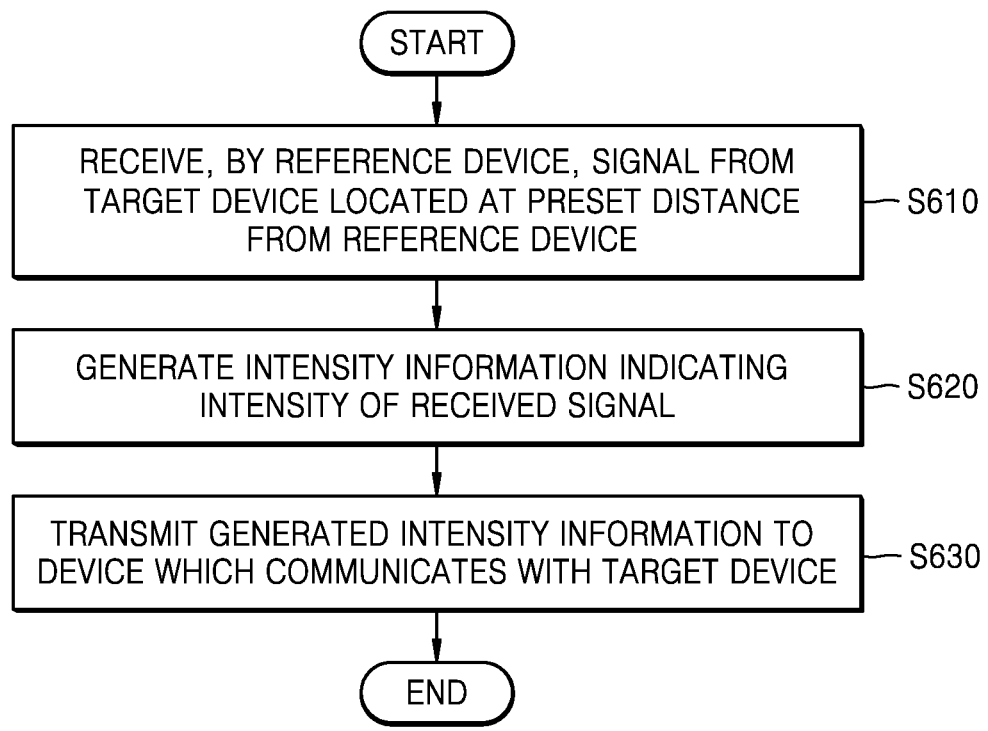
FIG. 6 illustrates a flowchart of a method by which a reference device provides intensity information to be used to determine a distance between devices, according to an exemplary embodiment.

FIG. 6 illustrates a flowchart of a method by which the reference device 130 provides intensity information to be used to determine a distance between devices, according to an exemplary embodiment.

In operation S610, the reference device 130 receives a signal from the target device 120 located at a preset distance from the reference device 130.

According to an exemplary embodiment, the reference device 130 may receive any one of a plurality of signals transmitted from the target device 120 at the same time. Herein, the plurality of signals may be transmitted at a same intensity.

In addition, the reference device 130 may be located at the preset distance from the target device 120. For example, the reference device 130 may be located at a distance of 2 m from the target device 120. However, this is only illustrative, and the distance between the reference device 130 and target device 120 may be changed.

The signal received by the reference device 130 from the target device 120 may correspond to the second signal described above with reference to FIGS. 1 through 5.

In operation S620, the reference device 130 generates intensity information indicating an intensity of the received signal.

According to an exemplary embodiment, the reference device 130 may determine whether the received signal is transmitted from the target device 120. For example, the reference device 130 may confirm that the signal received by the reference device 130 is transmitted from the target device 120 by checking an identification value of the target device 120, which is included in a header of the received signal.

According to an exemplary embodiment, the reference device 130 may determine the intensity of the signal received from the target device 120. For example, the reference device 130 may measure power of the signal received from the target device 120. As an example, the intensity of the signal, which is determined by the reference device 130, may be 20 mW.

According to an exemplary embodiment, the reference device 130 may generate a packet indicating the generated intensity information. For example, the reference device 130 may generate a packet indicating a power value of 20 mW which corresponds to the determined intensity of the signal.

In operation S630, the reference device 130 transmits the generated intensity information to the device 110 which communicates with the target device 120.

According to an exemplary embodiment, the reference device 130 may transmit, to the device 110, the packet including the intensity information indicating the intensity of the signal received from the target device 120. Herein, the intensity information may be used for the device 110 to determine a distance between the target device 120 and the device 110.

According to another exemplary embodiment, the reference device 130 may transmit, to the device 110, information about the preset distance between the target device 120 and the reference device 130 together with the generated intensity information. For example, the reference device 130 may transmit, to the device 110, distance information indicating that the distance between the reference device 130 and the target device 120 is 2 m together with the information indicating that the intensity of the signal received from the target device 120 is 20 mW FIGS. 7 and 8 illustrate block diagrams of a device 700 for determining a distance between devices, according to an exemplary embodiment.

Figure 7:
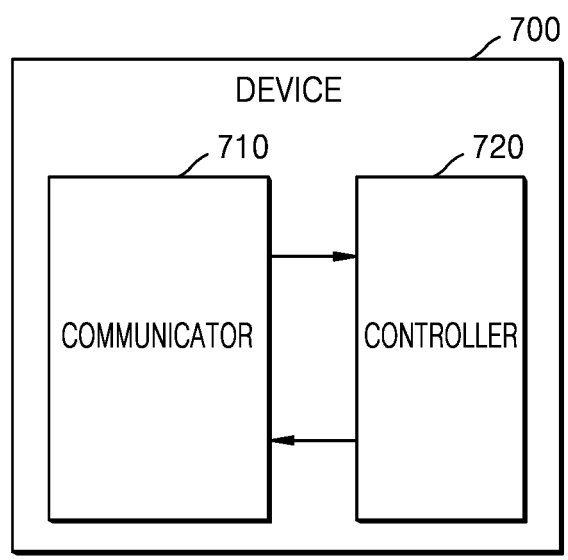
FIGS. 7 and 8 illustrate block diagrams of a device for determining a distance between devices, according to an exemplary embodiment.

As shown in FIG. 7, the device 700 according to an exemplary embodiment may include a communicator 710 and a controller 720. However, not all of the shown components are mandatory. The device 700 may be implemented by more or less components than the shown components.

Figure 8:
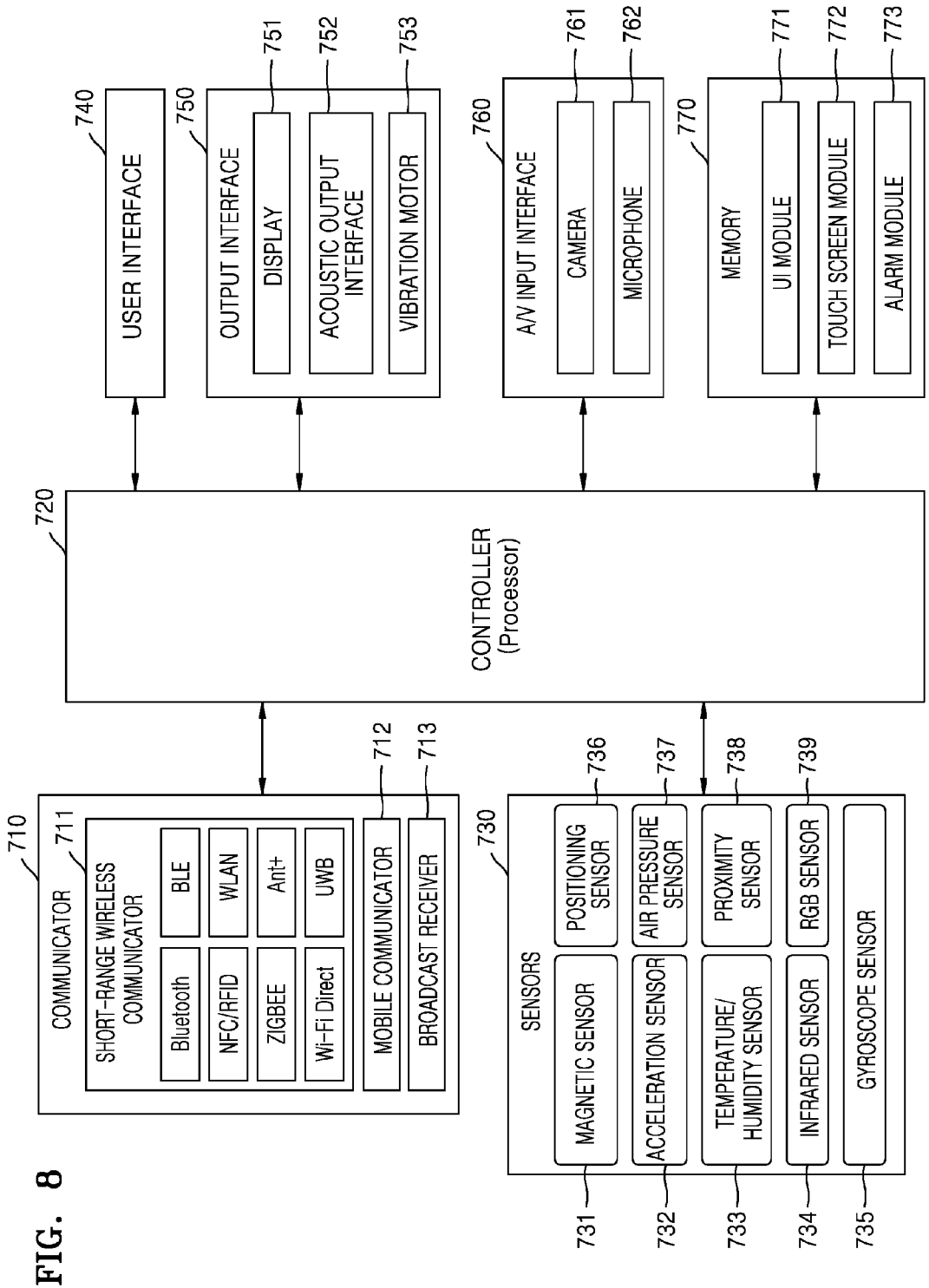

For example, as shown in FIG. 8, according to an exemplary embodiment, the device 700 may further include a sensors 730, a user interface 740, an output interface 750, an audio/video (A/V) input interface 760, and a memory 770 besides the communicator 710 and the controller 720.

The device 700 of FIG. 7 may correspond to the device 110 described above with reference to FIG. 1.

The components described above will now be sequentially described.

According to an exemplary embodiment, the communicator 710 receives a first signal from the target device 120. In addition, the communicator 710 receives, from the reference device 130, intensity information about an intensity of a second signal received by the reference device 130, which is located at a preset distance from the target device 120, from the target device 120. For example, the communicator 710 may receive a packet including a power value indicating the intensity of the second signal from the reference device 130. Herein, the first and second signals are broadcasted from the target device 120. In addition, the first and second signals are outputted from the target device 120 at a same intensity.

According to an exemplary embodiment, the communicator 710 acquires reference intensity information indicating an intensity of a received signal per unit distance, which is preset in the target device 120, from the target device 120. According to an exemplary embodiment, as described above with reference to FIG. 3, the reference intensity information may be used to determine a channel state between the device 700 and the target device 120.

The communicator 710 may include one or more components enabling the device 700 to communicate with the target device 120 or the reference device 130. For example, the communicator 710 may include a short-range wireless communicator 711, a mobile communicator 712, and a broadcast receiver 713.

The short-range wireless communicator 711 may include a Bluetooth communicator, a BLE communicator, a near-field communicator, a wireless local area network (WLAN) (Wi-Fi) communicator, a Zigbee communicator, an infrared data association (IrDA) communicator, Wi-Fi Direct (WFD) communicator, an ultra-wideband (UWB) communicator, an Ant+ communicator, and the like but is not limited thereto.

The mobile communicator 712 may transmit and receive a wireless signal to and from at least one of a base station, an external terminal, and a server in a mobile communication network. Herein the wireless signal may include a voice call signal, a video call signal, or various types of data according to text/multimedia message transmission and reception.

The broadcast receiver 713 may receive a broadcast signal and/or broadcast related information from the outside through a broadcast channel, and the broadcast channel may include a satellite channel and a terrestrial channel. According to implemented examples, the device 700 may not include the broadcast receiver 713.

The controller 720 may commonly control a general operation of the device 700. For example, the controller 720 may generally control the communicator 710, the sensors 730, the user interface 740, the output interface 750, the A/V input interface 760, the memory 770, and the like by executing programs stored in the memory 770.

According to an exemplary embodiment, the controller 720 may determine a distance between the device 700 and the target device 120 based on the received intensity information of the second signal and an intensity of the first signal received from the target device 120. Herein, the controller 720 may decode the packet including the power value indicating the intensity of the second signal, which has been received by the communicator 710, and acquire the power value of the second signal from the decoded packet.

According to an exemplary embodiment, the controller 720 may determine the distance between the device 700 and the target device 120 by comparing the intensity of the first signal received from the target device 120 with the intensity of the second signal received by the reference device 130 located at the preset distance from the target device 120.

According to an exemplary embodiment, the controller 720 may control the communicator 710 to establish short-range communication based on the BLE protocol between the device 700 and the target device 120.

According to another exemplary embodiment, the controller 720 may determine a channel state between the device 700 and the target device 120 by comparing the reference intensity information acquired from the target device 120 with the intensity information acquired from the reference device 130.

The sensors 730 may include at least one of a magnetic sensor 731, an acceleration sensor 732, a temperature/humidity sensor 733, an IR sensor 734, a gyroscope sensor 735, a position sensor 736, an atmospheric pressure sensor 737, a proximity sensor 738 and RGB (illuminance) sensor 739 but is not limited thereto. A function of each sensor may be intuitively inferred by those of ordinary skill in the art from a name thereof, and thus a detailed description thereof is omitted herein.

The user interface 740 may indicate a means through which a user inputs data for controlling the device 700. For example, the user interface 740 may include a keypad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, and the like but is not limited thereto.

The output interface 750 performs an operation determined by the controller 720 and may include a display 751, an acoustic output interface 752, a vibration motor 753, and the like.

The display 751 may display information processed by the device 700. For example, the display 751 may display at least a portion of a received image. The display 751 may display a received image on one side surface.

When the display 751 and a touch pad form a layer structure to configure a touch screen, the display 751 may be used as not only an output device but also an input device. The display 751 may include at least one of a liquid crystal display, a thin-film transistor liquid crystal display, an organic light-emitting diode, a flexible display, a three-dimensional (3D) display, and an electrophoretic display. The device 700 may include two or more displays 751 according to an implementation form of the device 700. The two or more displays 751 may be disposed to face each other by using a hinge.

The acoustic output interface 752 may output audio data received through the communicator 710 or stored in the memory 770. In addition, the acoustic output interface 752 may output an acoustic signal related to a function (e.g., a call signal reception sound, a message reception sound, or an alarm sound) performed by the device 700. The acoustic output interface 752 may include a speaker, a buzzer, and the like.

The vibration motor 753 may output a vibration signal. For example, the vibration motor 753 may output a vibration signal corresponding to an output of audio data or video data (e.g., a call signal reception sound, a message reception sound, or the like). In addition, the vibration motor 753 may output a vibration signal when a touch is inputted through the touch screen.

The A/V input interface 760 may be used to input an audio signal or a video signal and may include a camera 761, a microphone 762, and the like. The camera 761 may receive an image frame of a still image, a moving picture, or the like through an image sensor in a video call mode or a capturing mode. An image captured through the image sensor may be processed by the controller 720 or a separate image processing unit (not shown).

The image frame processed by the camera 761 may be stored in the memory 770 or transmitted to the outside through the communicator 710. Two or more cameras 761 may be provided depending on an implementation form of the device 700.

The microphone 762 may receive an external acoustic signal and process the external acoustic signal to electrical voice data. For example, the microphone 762 may receive an acoustic signal from an external device or a speaker. The microphone 762 may use various noise cancellation algorithms to cancel noise generated during a process of receiving an external acoustic signal.

The memory 770 may store programs for processing and control of the controller 720 and store inputted/outputted data.

According to an exemplary embodiment, the memory 770 may include or contain information about a preset distance between the target device 120 and the reference device 130.

The memory 770 may include at least one type of storage medium among a flash memory type memory, a hard disk type memory, a multimedia card micro type memory, a card type memory (e.g., a secure digital (SD) or extreme digital (XD) memory or the like), random access memory (RAM), static RAM (SRAM), read only memory (ROM), electrically erasable programmable ROM (EEPROM), PROM, a magnetic memory, a magnetic disc, and an optical disc. In addition, the device 700 may operate a web storage or a cloud server which performs a storage function of the memory 770 over the Internet.

The programs stored in the memory 770 may be classified into a plurality of modules according to functions thereof, e.g., a user interface (UI) module 771, a touch screen module 772, an alarm module 773, and the like.

The UI module 771 may provide a specified UI, a graphic user interface (GUI), or the like interoperating with the device 700 for each application. The touch screen module 772 may sense a touch gesture of the user on the touch screen and transmit information regarding the touch gesture to the controller 720. According to an exemplary embodiment, the touch screen module 772 may recognize and analyze a touch code. The touch screen module 772 may be configured by separate hardware including a controller.

Various sensors for sensing a touch or a proximity touch on the touch screen may be provided inside or nearby the touch screen. An example of a sensor for sensing a touch on the touch screen is a tactile sensor. The tactile sensor is a sensor for sensing a contact of a specific object at a degree of human feeling or more. The tactile sensor may sense various pieces of information such as roughness of a contact surface, hardness of a contact object, a temperature of a contact point, and the like.

Another example of a sensor for sensing a touch on the touch screen is the proximity sensor 738.

The proximity sensor 738 is a sensor for detecting whether an object approaching a predetermined detection surface or a nearby object exists by using an electromagnetic force or an IR ray without a mechanical contact. Examples of the proximity sensor 738 are a transmissive optoelectric sensor, a direct reflective optoelectric sensor, a mirror reflective optoelectric sensor, a high-frequency oscillation proximity sensor, a capacitive proximity sensor, a magnetic proximity sensor, an IR proximity sensor, and the like. Examples of a touch gesture of the user are a tap, a touch and hold, a double tap, a drag, a panning, a flick, a drag & drop, a swipe, and the like.

The alarm module 773 may generate a signal for notifying of the occurrence of an event of the device 700. Examples of an event generated by the device 700 are call signal reception, message reception, a key signal input, a schedule notification, acquisition of a user input, and the like. The alarm module 773 may output an alarm signal in a video signal form through the display 751, an alarm signal in an audio signal form through the acoustic output interface 752, or an alarm signal in a vibration signal form through the vibration motor 753.

Figure 9:
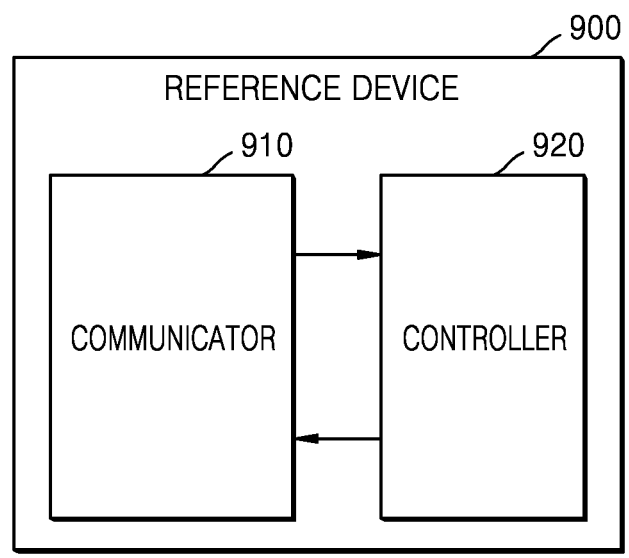
FIG. 9 illustrates a block diagram of a reference device for determining a distance between devices, according to an exemplary embodiment.

FIG. 9 illustrates a block diagram of a reference device 900 for determining a distance between devices, according to an exemplary embodiment.

As shown in FIG. 9, the reference device 900 according to an exemplary embodiment may include a communicator 910 and a controller 920. However, not all of the shown components are mandatory. The reference device 900 may be implemented by more or less components than the shown components.

The reference device 900 of FIG. 9 may correspond to the reference device 130 described above with reference to FIG. 1.

The components described above will now be sequentially described.

According to an exemplary embodiment, the communicator 910 receives a signal from the target device 120 located at a preset distance from the reference device 900. Herein, the signal may be one of a plurality of signals transmitted from the target device 120. In addition, the signal may correspond to the second signal described above with reference to FIG. 1.

According to an exemplary embodiment, the communicator 910 transmits intensity information generated with respect to the received signal to the device 110 which communicates with the target device 120. The intensity information of the received signal may be generated by the controller 920 to be described below.

According to an exemplary embodiment, the controller 920 generates the intensity information indicating an intensity of the signal received by the communicator 910. The intensity information may be used for the device 110 to determine a distance between the target device 120 and the device 110 by being compared with an intensity of a different signal (e.g., the first signal of FIG. 1) received by the device 110 from the target device 120. In addition, the signal received by the reference device 900 and the different signal received by the device 110 may be outputted from the target device at a same intensity.

According to an exemplary embodiment, the controller 920 may generate a packet indicating the generated intensity information. For example, the reference device 900 may generate a packet indicating a determined power value of a signal.

According to another exemplary embodiment, the controller 920 may control the communicator 910 to transmit information about the preset distance between the target device 120 and the reference device 900 together with the generated intensity information to the device 110.

An apparatus according to one or more of the exemplary embodiments may include a processor, a memory for storing and executing program data, a permanent storage such as a disk drive, a communication port for performing communication with an external device, and a user interface, such as a communication port for communicating with an external device, a touch panel, a key, and a button. Methods implemented with a software module or an algorithm may be stored in a non-transitory computer-readable recording medium in the form of computer-readable codes or program instructions executable in the processor. Examples of the computer-readable recording medium include magnetic storage media (e.g., ROM, RAM, floppy disks, hard disks, etc.) and optical recording media (e.g., CD-ROMs, Digital Versatile Discs (DVDs), etc.). The non-transitory computer-readable recording medium can also be distributed over network coupled computer systems so that the computer-readable code is stored and executed in a distributed fashion. The media can be read by a computer, stored in the memory, and executed by the processor.

All cited references including publicized documents, patent applications, and patents cited in the exemplary embodiments can be merged in the exemplary embodiments in the same manner as the shown by individually and concretely merging each cited reference and the shown by generally merging each cited reference in the exemplary embodiments.

For the understanding of the exemplary embodiments, reference numerals are disclosed in the exemplary embodiments shown in the drawings, and specific terms are used to describe the exemplary embodiments. However, the exemplary embodiments are not limited by the specific terms, and the exemplary embodiments may include all components, which can be commonly thought by those of ordinary skill in the art.

The exemplary embodiments can be represented with functional blocks and various processing steps. These functional blocks can be implemented by various numbers of hardware and/or software configurations for executing specific functions. For example, the exemplary embodiments may adopt direct circuit configurations, such as memory, processing, logic, and look-up table, for executing various functions under control of one or more processors or by other control devices. Like components of the exemplary embodiments being able to execute the various functions with software programming or software elements, the exemplary embodiments can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the exemplary embodiments may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

Specific executions described in the exemplary embodiments are exemplary embodiments and do not limit the scope of the exemplary embodiments even in any method. For conciseness of the specification, disclosure of conventional electronic configurations, control systems, software, and other functional aspects of the systems may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus. In addition, if there is no concrete use of terms such as "requisite" or "important" to refer a component, that component may not be necessarily required for application of the exemplary embodiments.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of determining a distance between a device and a target device, the method comprising:

receiving, by the device, a first signal from the target device, the first signal being associated with a first intensity;

receiving, from a reference device located at a predetermined distance from the target device, intensity information corresponding to a second intensity associated with a second signal received by the reference device from the target device; and determining the distance between the device and the target device based on the first intensity, the predetermined distance, and the intensity information corresponding to the second intensity.

2. The method of claim 1, wherein the determining of the distance comprises comparing the second intensity, which corresponds to the predetermined distance between the target device and the reference device, with the first intensity.

3. The method of claim 1, wherein the first signal is broadcasted from the target device at an output intensity, and the second signal is broadcasted from the target device at the output intensity.

4. The method of claim 1, wherein the intensity information is comprised within a packet including a power value indicating the second intensity from the reference device.

5. The method of claim 4, further comprising:
decoding the received packet; and
acquiring the power value from the decoded packet.

6. The method of claim 1, further comprising:
acquiring, from the target device, reference intensity information indicating an intensity of a received signal per a unit distance, which has been predetermined by the target device; and
determining channel state between the device and the target device by comparing the reference intensity information with the intensity information.

7. The method of claim 1, wherein the intensity information corresponding to the second intensity is generated by the reference device.

8. The method of claim 1, wherein the second signal is transmitted by the target device located at the predetermined distance from the reference device.

9. The method of claim 8, wherein the intensity information comprises information about the second intensity and the predetermined distance.

10. A non-transitory computer-readable medium having recorded thereon a computer-readable program for executing the method of claim 1.

11. A device for determining a distance between the device and a target device, the device comprising:
a communicator configured to receive a first signal from the target device, the first signal being associated with a first intensity, and to receive, from a reference device located at a predetermined distance from the target device, intensity information corresponding to a second intensity of a second signal received by the reference device from the target device; and a controller configured to determine the distance between the device and the target device based on the first intensity, the predetermined distance, and the intensity information corresponding to the second intensity.

12. The device of claim 11, wherein the controller is further configured to determine the distance between the device and the target device by comparing the second intensity, which corresponds to the predetermined distance between the target device and the reference device, and the first intensity.

13. The device of claim 11, wherein the first signal is broadcasted from the target device at an output intensity, and the second signal is broadcasted from the target device at the output intensity.

14. The device of claim 11, wherein the communicator is further configured to receive a packet including a power value indicating the second intensity from the reference device.

15. The device of claim 14, wherein the controller is further configured to decode the received packet and acquire the power value from the decoded packet.

16. The device of claim 11, wherein the communicator is further configured to acquire, from the target device, reference intensity information indicating an intensity of a received signal per a unit distance, which has been predetermined by the target device, and
the controller is further configured to determine a channel state between the device and the target device by comparing the reference intensity information with the intensity information.

17. The device of claim 11, wherein the intensity information corresponding to the second intensity is generated by the reference device.

18. The device of claim 11, wherein the second signal is transmitted by the target device located at the predetermined distance from the reference device.

19. The reference device of claim 18, wherein the intensity information comprises information about the second intensity and the predetermined distance.

20. The reference device of claim 11, wherein the controller is further configured to determine the distance between the device and the target device based on the predetermined distance, the first intensity and the intensity information corresponding to the second intensity.

* * * * *